US011125718B2

(12) United States Patent
Zhang

(10) Patent No.: US 11,125,718 B2
(45) Date of Patent: Sep. 21, 2021

(54) METHOD AND DEVICE FOR OPERATING A NITROGEN OXIDE SENSOR

(71) Applicant: Continental Automotive GmbH, Hannover (DE)

(72) Inventor: Hong Zhang, Tegernheim (DE)

(73) Assignee: VITESCO TECHNOLOGIES GMBH, Hanover (DE)

( * ) Notice: Subject to any disclaimer, the term of this patent is extended or adjusted under 35 U.S.C. 154(b) by 405 days.

(21) Appl. No.: 16/305,218

(22) PCT Filed: May 4, 2017

(86) PCT No.: PCT/EP2017/060672
§ 371 (c)(1),
(2) Date: Nov. 28, 2018

(87) PCT Pub. No.: WO2017/207208
PCT Pub. Date: Dec. 7, 2017

(65) Prior Publication Data
US 2020/0319139 A1 Oct. 8, 2020

(30) Foreign Application Priority Data
May 31, 2016 (DE) ..................... 10 2016 209 360.6

(51) Int. Cl.
G01N 27/407 (2006.01)
G01N 27/419 (2006.01)
(Continued)

(52) U.S. Cl.
CPC ......... G01N 27/419 (2013.01); F01N 11/007 (2013.01); F02B 77/086 (2013.01); G01N 27/407 (2013.01)

(58) Field of Classification Search
CPC .. G01N 27/407; G01N 27/41; G01N 27/4065; F01N 2560/021; F01N 2560/026; F02B 77/086
See application file for complete search history.

(56) References Cited

U.S. PATENT DOCUMENTS 6,017,503 A   1/2000  Kato et al. .................... 423/235
9,181,845 B2  11/2015 Maertens
(Continued)

FOREIGN PATENT DOCUMENTS

CN   101048656 A   10/2007   .......... G01N 27/414
CN   102798609 A   11/2012   ......... G01N 21/3504
(Continued)

OTHER PUBLICATIONS

EPO computer-generated English language translation of Endou et al. WO 2012/176280 A1, patent published Dec. 27, 2012, downloaded Mar. 4, 2021 (Year: 2012).*
(Continued)

Primary Examiner — Alexander S Noguerola
(74) Attorney, Agent, or Firm — Slayden Grubert Beard PLLC

(57) ABSTRACT

A method for operating a nitrogen oxide sensor comprising: sensing a first measurement signal of the nitrogen oxide sensor, the first measurement signal representing a detected voltage between a reference electrode and an external electrode; sensing a second measurement signal representing a measured gas content in a measuring chamber of the nitrogen oxide sensor; comparing the first measurement signal with a predefined first threshold value; and if the first threshold value is exceeded, assigning the second measurement signal to an emission of NH3.

7 Claims, 2 Drawing Sheets

(51) Int. Cl.
    *F01N 11/00* (2006.01)
    *F02B 77/08* (2006.01)

(56) References Cited

U.S. PATENT DOCUMENTS

| | | | |
|---|---|---|---|
| 2007/0080074 A1 | 4/2007 | Wang et al. | 205/780.5 |
| 2008/0134759 A1 | 6/2008 | Mohammed-brahim et al. | 73/31.06 |
| 2012/0145543 A1 | 6/2012 | Sugaya et al. | 204/424 |
| 2014/0308190 A1 | 10/2014 | Maertens | 423/212 |
| 2016/0123945 A1 | 5/2016 | Qi et al. | 73/23.31 |

FOREIGN PATENT DOCUMENTS

| | | | | |
|---|---|---|---|---|
| CN | 104126060 A | | 10/2014 | F01N 3/20 |
| DE | 10 2010 028 543 A1 | | 11/2011 | G01N 27/407 |
| DE | 102010040147 A1 | | 3/2012 | G01N 27/407 |
| DE | 10 2014 016 952 A1 | | 5/2016 | F01N 11/00 |
| DE | 10 2015 117 530 A1 | | 5/2016 | F01N 11/00 |
| JP | 2009511859 A | | 3/2009 | G01N 27/416 |
| JP | 2009288220 A | | 12/2009 | G01N 27/416 |
| JP | 2012127668 A | | 7/2012 | G01N 27/416 |
| WO | WO 2012176280 A | * | 12/2012 | F01N 3/08 |
| WO | 2016/005520 A1 | | 1/2016 | G01N 27/419 |
| WO | 2017/207208 A1 | | 12/2017 | G01N 27/419 |

OTHER PUBLICATIONS

Google translation of German Office Action for application No. 10 2016 209 360.6, dated Jul. 2, 2020 (Year: 2020).*
EPO computer-generated English language translation of DE 102014213484 A1, patent published Jan. 6, 2014, downloaded Mar. 4, 2021 (Year: 2014).*
Chinese Office Action for application No. 201780033927.7, English language version from Global Dossier, dated Apr. 1, 2020 (Year: 2020).*
Basshuysen et al., Handbuch Verbrennungsmotor, $2^{nd}$ Edition, Jun. 2002, p. 589-591 (German language w/English Statement of Relevance), Jul. 22, 2001.
German Office Action, Application No. 10 2016 209 360.6, 7 pages, dated Apr. 5, 2017.
International Search Report and Written Opinion, Application No. PCT/EP2017/060672, 17 pages, dated Jul. 20, 2017.
Korean Notice of Allowance, Application No. 2020069714780, 3 pages, dated Oct. 12, 2020.
German Office Action, Application No. 102016209360.6, 7 pages, dated Jul. 17, 2020.
Chinese Office Action, Application No. 201780033927.7, 7 pages, dated Apr. 1, 2020.

* cited by examiner

METHOD AND DEVICE FOR OPERATING A NITROGEN OXIDE SENSOR

CROSS-REFERENCE TO RELATED APPLICATIONS

This application is a U.S. National Stage Application of International Application No. PCT/EP2017/060672 filed May 4, 2017, which designates the United States of America, and claims priority to DE Application No. 10 2016 209 360.6 filed May 31, 2016, the contents of which are hereby incorporated by reference in their entirety.

TECHNICAL FIELD

The present disclosure relates to internal combustion engines. Various embodiments may include a method and/or a device for operating a nitrogen oxide sensor.

BACKGROUND

Ever more stringent legal requirements relating to permissible emissions of pollutants in motor vehicles in which internal combustion engines are arranged make it necessary to keep the emissions of pollutants during the operation of the internal combustion engine as low as possible. On account thereof, it is necessary for the pollutant components in the exhaust tract to be determined in a very precise manner, in particular for the use of exhaust gas post-treatment systems such as catalytic converters. To determine the nitrogen oxide content of the exhaust gas, use is made, in particular, of nitrogen oxide sensors.

A nitrogen oxide sensor based on $ZrO_2$ ceramic and having two chambers is known from the reference manual "Handbuch Verbrennungsmotoren" [Internal Combustion Engine Handbook], edited by Richard von Basshuysen/Fred Schäfer, 2nd edition, June 2002, Friedrich Vieweg & Sohn Verlagsgesellschaft mbH Braunschweig/Wiesbaden, page 589 ff. A constant partial pressure of the oxygen contained in the exhaust gas is established in the first chamber by applying a pumping current. The pumping current is proportional to the air-to-fuel ratio, for example. The nitrogen oxide contained in the exhaust gas is decomposed in the second chamber by applying a further current. After this, a current which is proportional to the nitrogen oxide content in the exhaust gas and which forms the measurement signal of the nitrogen oxide sensor can be measured at a measuring electrode in the second chamber.

SUMMARY

The teachings of the present disclosure may be embodied in a method and/or a device which contribute to a very precise measurement of the emission of NOx and to a very precise measurement of the emission of NH3. For example, some embodiments may include a method for operating a nitrogen oxide sensor (10), in which a first measurement signal of the nitrogen oxide sensor (10) which is representative of a detected voltage between a reference electrode (20) and an external electrode (17) is determined, a second measurement signal which is representative of a measured gas content in a measuring chamber (13) of the nitrogen oxide sensor (10) is determined, the first measurement signal is compared with a predefined first threshold value, and when the first threshold value is exceeded, the second measurement signal is assigned to an emission of NH3.

In some embodiments, the second measurement signal is compared with a predefined second threshold value, and when the second threshold value is undershot, the second measurement signal is assigned to an emission of NOx if the first measurement signal undershoots the predefined first threshold value.

In some embodiments, the method is carried out during a nitrogen oxide trap regeneration phase.

In some embodiments, the predefined first threshold value is approximately 450 mV.

In some embodiments, the predefined second threshold value is approximately 10 ppm.

As another example, some embodiments include a device (1) for operating a nitrogen oxide sensor (10), wherein the device (1) is designed to carry out a method as described above.

As another example, some embodiments include a computer program for operating a nitrogen oxide sensor (10), wherein the computer program is designed to carry out a method as described above when it is executed on a data processing device.

As another example, some embodiments include a computer program product comprising executable program code, wherein, in the case of execution by a data processing device, said program code executes the method as described above.

BRIEF DESCRIPTION OF THE DRAWINGS

Exemplary embodiments of the teachings here are explained in more detail hereinbelow by means of the schematic drawings.

In the drawings.

DETAILED DESCRIPTION

Figure 1:
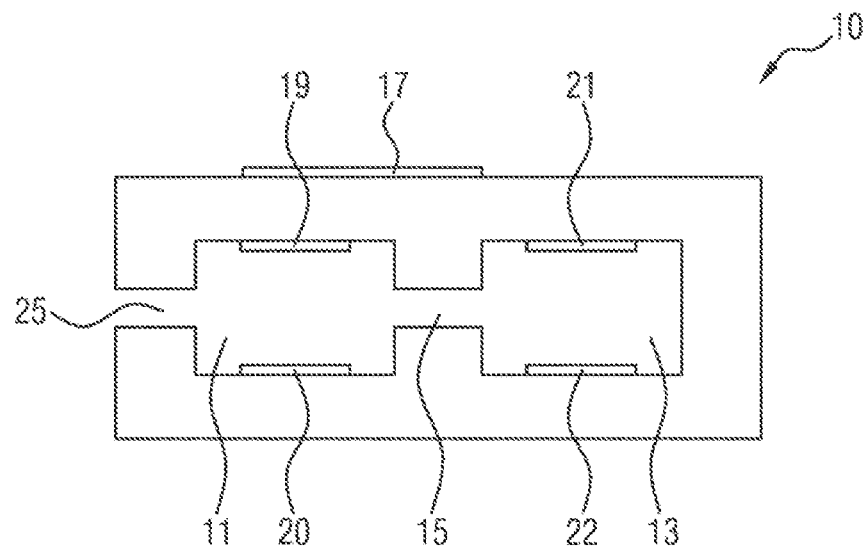
FIG. 1 shows a nitrogen oxide sensor.

Some embodiments of the teachings herein include a method for operating a nitrogen oxide sensor and/or a device for operating the nitrogen oxide sensor, wherein the device is designed to perform the method for operating the nitrogen oxide sensor.

In some embodiments, a first measurement signal of the nitrogen oxide sensor which is representative of a detected voltage between a reference electrode and an external electrode is determined. A second measurement signal which is representative of a measured gas content in a measuring chamber of the nitrogen oxide sensor is determined. The first measurement signal is compared with a predefined first threshold value. When the first threshold value is exceeded, the second measurement signal is assigned to an emission of NH3.

The external electrode is, in some embodiments, a pumping electrode which is arranged externally on the nitrogen oxide sensor and is therefore in direct contact with the exhaust gas during operation. The reference electrode is, in some embodiments, an electrode which is not arranged externally on the nitrogen oxide sensor. For example, the reference electrode may be arranged in a first chamber of the nitrogen oxide sensor.

In some embodiments, in a nitrogen oxide trap regeneration phase, the nitrogen oxide sensor can be used both for measuring NOx and for measuring NH3, since the nitrogen oxide sensor is cross-sensitive to NH3. By means of the method described above, the switch-over point from the emission of NOx to the emission of NH3 can be determined very precisely, so that a very precise measurement of the emission of NOx and a very precise measurement of the emission of NH3 can be carried out.

In some embodiments, it is also possible to use a model for the determination, but this is less precise so that it is not possible to carry out such a precise measurement of the emission of NOx or precise measurement of the emission of NH3. In some embodiments, lambda sensors determine the switch-over time. In this context, the signal profiles of a lambda sensor upstream of the nitrogen oxide trap and of a lambda sensor downstream of the nitrogen oxide trap are observed. These two signal profiles intersect in the nitrogen oxide trap regeneration phase. Upstream of the point of intersection, a measurement signal of the nitrogen oxide sensor is then assigned to the emission of NOx, and downstream of said point it is assigned to the emission of NH3. However, this assignment is also not as precise as in the method described above. Furthermore, the method described above does not require a lambda sensor.

In some embodiments, the second measurement signal is compared with a predefined second threshold value, and when the second threshold value is undershot, the second measurement signal is assigned to an emission of NOx if the first measurement signal undershoots the predefined first threshold value. As a result, it is possible to easily switch over again to the emission of NOx. In other words, after the first measurement signal undershoots the predefined first threshold value, the second measurement signal is compared with the second threshold value, and when the second threshold value is undershot, the second measurement signal is assigned to an emission of NOx.

In some embodiments, the method is carried out during a nitrogen oxide trap regeneration phase. The precise measurement of NH3 is particularly important especially in the nitrogen oxide trap regeneration phase, in particular for SCR (selective catalytic reduction) control. The nitrogen oxide trap is, in some embodiments, an LNT (Lean NOx trap).

In some embodiments, the predefined first threshold value is approximately 450 mV. At approximately 450 mV, the changeover from the emission of NOx to the emission of NH3 takes place, that is to say at approximately 450 mV the emission of NOx approaches zero and the emission of NH3 begins to increase, so that a very precise measurement can actually take place with a first threshold value of 450 mV. Approximately 450 mV comprises here, for example, 450 mV±10%.

In some embodiments, the predefined second threshold value is approximately 10 ppm. If the emission of NH3 approaches zero, it can be assumed that no further emission of NH3 occurs, so that when there is a very low emission of NH3 it is possible to switch over to measurement of NOx again. Approximately 10 ppm comprises here, for example, 5-15 ppm.

In some embodiments, the method may be implemented by a computer program, wherein the computer program is designed to carry out the method for operating a nitrogen oxide sensor. In some embodiments, the method may be executed by a computer program product which comprises an executable program code, wherein the program code is designed to execute the method for operating a nitrogen oxide sensor in the case of execution by a data processing device. The computer program product comprises, in some embodiments, a medium which can be read by the data processing device and on which the program code is stored.

FIG. 1 shows a nitrogen oxide sensor 10. The nitrogen oxide sensor 10 is arranged, in some embodiments, in an exhaust tract of a vehicle. The vehicle has a first nitrogen oxide sensor 10, a second nitrogen oxide sensor 10, and a nitrogen oxide trap, wherein the first nitrogen oxide sensor 10 is arranged upstream of the nitrogen oxide trap in the direction of flow of the exhaust gas, and the second nitrogen oxide sensor 10 is arranged downstream of the nitrogen oxide trap in the direction of flow of the exhaust gas. The nitrogen oxide trap is, in some embodiments, an LNT (Lean NOx trap). The vehicle additionally has, for example, two lambda sensors, wherein a lambda sensor is arranged upstream of the nitrogen oxide trap in the direction of flow of the exhaust gas, and the other lambda sensor is arranged downstream of the nitrogen oxide trap in the direction of flow of the exhaust gas.

The nitrogen oxide sensor 10 has an inlet 25, for example, through which exhaust gas can flow into a first chamber 11. Furthermore, the nitrogen oxide sensor 10 has a diffusion path 15 and a measuring chamber 13. Furthermore, the nitrogen oxide sensor 10 can have further chambers and further diffusion paths. In particular, the nitrogen oxide sensor 10 has an external electrode 17 for each chamber 11, 13 or, as shown, has a common external electrode 17. The external electrode 17 is embodied, in particular, as a pumping electrode.

In some embodiments, a reference electrode 20 is arranged in the first chamber 7. The reference electrode 20 can also be arranged in some other position on the nitrogen oxide sensor 10. In addition, it has a ground electrode 19, 21 for the first chamber 11 and the measuring chamber 13 individually or for both chambers in common. In some embodiments, a measuring electrode 22 is arranged in the measuring chamber 13.

By means of the external electrode 17 and the ground electrode 19, it is possible, for example, to establish a first pumping current in the first chamber 11 in such a way that disruptive gases flow out of the inlet 25 again, so that the gas content of the gas which is to be measured can be measured in the measuring chamber 13, said gas entering the measuring chamber 13 via the diffusion path 15. This is achieved, for example, by producing a constant partial pressure of the oxygen contained in the exhaust gas by applying the first pumping current. The first pumping current is proportional to the air-to-fuel ratio, for example.

By means of the external electrode 17 and the ground electrode 21, it is possible, for example, to establish a second pumping current in such a way that the gas which is to be measured is decomposed in the measuring chamber 13. A voltage can be measured between the reference electrode 20 and the external electrode 17. This voltage forms a first measurement signal.

A current which is proportional to the gas content to be measured in the exhaust gas is measured across the measuring electrode 22. This current forms a second measurement signal of the nitrogen oxide sensor 10.

The nitrogen oxide sensor 10 is designed, in some embodiments, to determine an NOx gas content. However, the nitrogen oxide sensor is also cross-sensitive to NH3, so that an NH3 gas content can also be determined.

A control device 1 operates the nitrogen oxide sensor 10, in particular the second nitrogen oxide sensor 10, that is to say, in particular, to activate the external electrodes 17 of the nitrogen oxide sensors 10 and to receive the first and second measurement signals. For this purpose, the control device 1 may comprise a processing unit, a program and data memory and, for example, one or more communication interfaces.

The program and data memory and/or the processing unit and/or the communication interfaces may be formed in a single module and/or may be distributed between several modules.

The control device 1 can also be referred to as a device for operating a nitrogen oxide sensor 10. For this purpose, a program for operating the nitrogen oxide sensor 10, in particular, is stored in the data and program memory of the control device 1.

Figure 2:
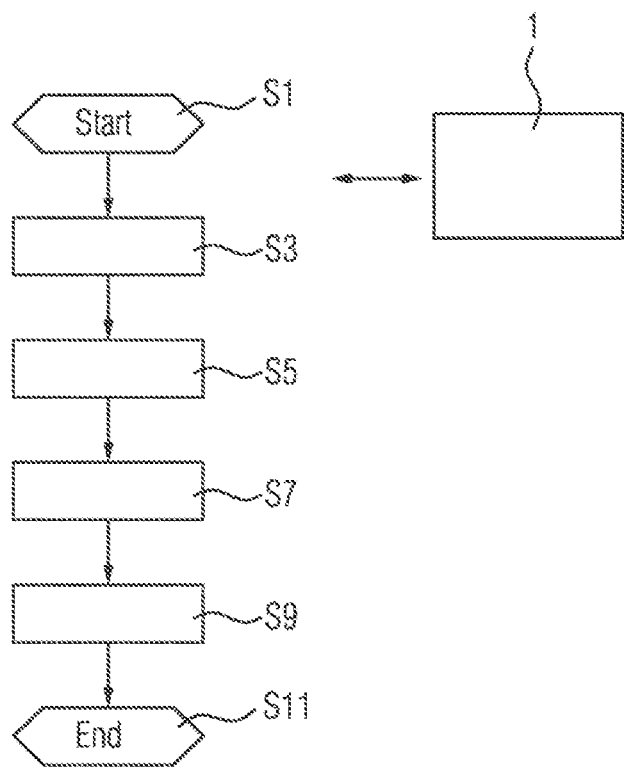
FIG. 2 shows a flow diagram relating to the operation of a nitrogen oxide sensor.

FIG. 2 shows a flow diagram of the program for operating the nitrogen oxide sensor 10, in particular the second nitrogen oxide sensor 10. The program is started in a step S1, in which variables can optionally be initialized. The program is executed, in particular, in a nitrogen oxide trap regeneration phase.

In a step S3, the first measurement signal of the nitrogen oxide sensor 10 which is representative of a detected voltage between the reference electrode 20 and the external electrode 17 is determined.

In a step S5, the second measurement signal which is representative of a measured gas content in the measuring chamber 13 of the nitrogen oxide sensor 10 is determined.

In a step S7, the first measurement signal is compared with a predefined first threshold value.

In a step S9, when the first threshold value is exceeded, the second measurement signal is assigned to an emission of NH3.

Before the first measurement signal exceeds the threshold value, the second measurement signal is assigned to an emission of NOx. In other words, the second measurement signal is initially assigned to an emission of NOx, and an emission of NH3 is set to zero. After the first measurement signal exceeds the threshold value, the second measurement signal is assigned to an emission of NH3. In other words, after the value is exceeded, the second measurement signal is assigned to an emission of NH3, and an emission of NOx is set to zero. Therefore, only either NOx or NH3 is ever measured. The predefined first threshold value lies, for example, between 400 and 500 mV, in particular it is 450 mV.

After the assignment to the emission of NH3, some methods also detect an end of the emission of NH3 and an assignment to NOx can occur again. Thus, the first measurement signal is first compared with the predefined first threshold value. When the value is undershot, for example the second measurement signal is compared with a predefined second threshold value, and when the second threshold value is undershot the second measurement signal is assigned to an emission of NOx. In other words, after the value is undershot, the second measurement signal is assigned to an emission of NOx, and an emission of NH3 is set to zero. The predefined second threshold value lies, for example, between 3 ppm and 15 ppm, in particular it is 5 or 10 ppm.

In a step S11, the program is ended, and may be started again in the step S1 as necessary.

Figure 3:
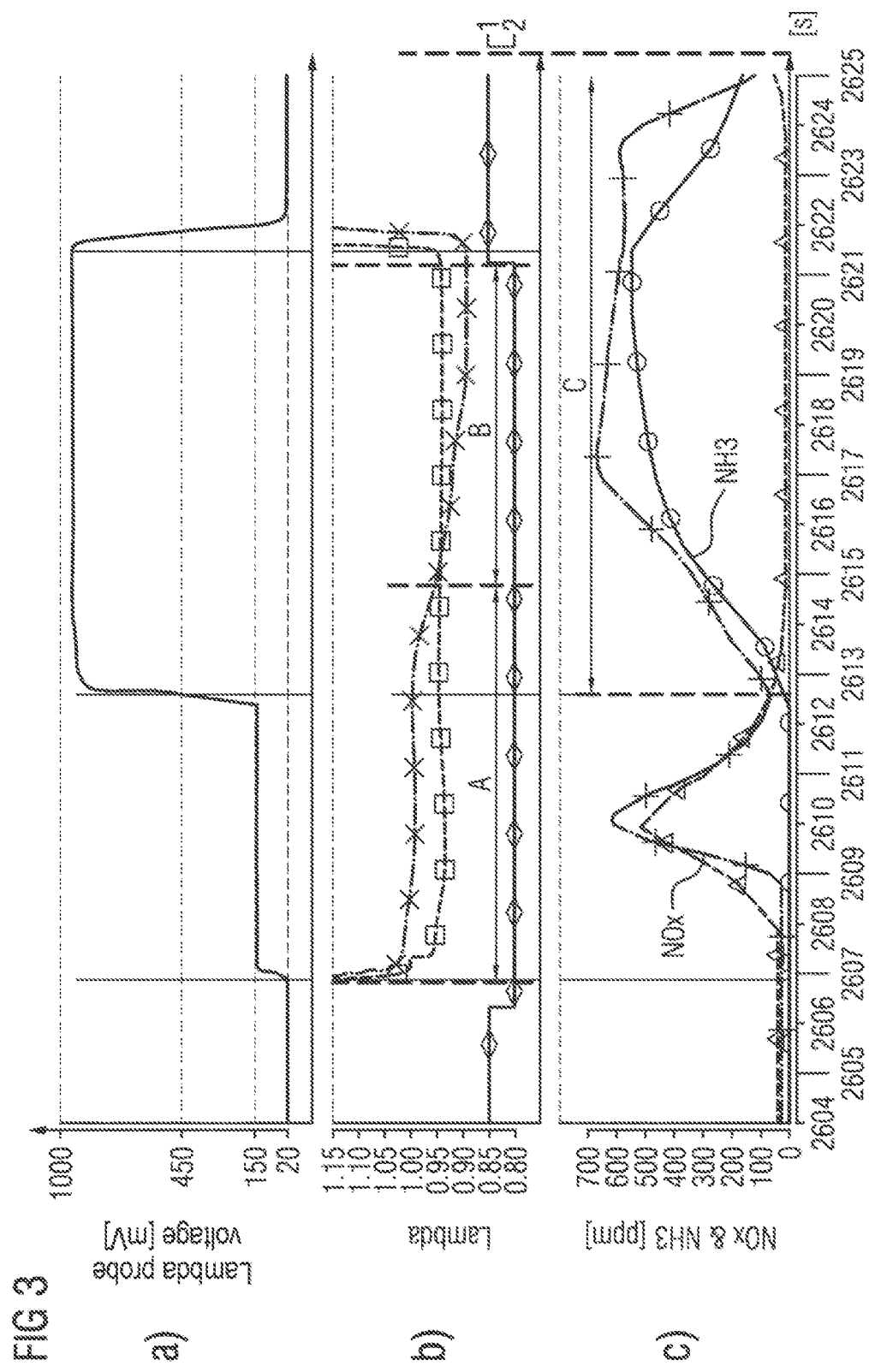
FIG. 3 shows various signal profiles.

FIG. 3 illustrates the implementation of the method described above. FIG. 3a shows an exemplary sequence of the first measurement signal plotted against the time. FIG. 3b shows measured values of the lambda sensors plotted against the time. The square-wave signal corresponds here to the measurement signal of the lambda sensor which is arranged upstream of the nitrogen oxide trap in the direction of flow of the exhaust gas. The cross signal corresponds here to the measurement signal of the lambda sensor which is arranged downstream of the nitrogen oxide trap in the direction of flow of the exhaust gas. The rhombus signal represents the operating mode which has been set. The operating mode 1 corresponds to operation with a rich mixture, that is to say, in particular, to a lambda value of less than 0.9. The operating mode 2 corresponds to operation with a lean mixture, that is to say, in particular, to a lambda value of greater than 1.

FIG. 3c shows measured values of the second nitrogen oxide sensor 10 plotted against the time. The cross signal corresponds here to a sum signal composed of NH3 and NOx. The triangular signal corresponds to the emission of NOx determined by means of the method described above. The cross signal corresponds to the emission of NH3 determined by means of the method described above. In the case of the dashed line in FIG. 3c, the first measurement signal exceeds the first threshold value (see FIG. 3a), and the emission of NOx is therefore set to zero, and the second measurement signal is assigned to the emission of NH3 for the rest of the time period C. As is apparent from the cross signal, in this way it is possible to very precisely model the real emission of NOx and the real emission of NH3.

In some embodiments, the lambda sensor can be used to determine the switch-over time, as can be seen in FIG. 3b. In this context, the intersection point of the two lambda signals is used as a switch-over time. Before the intersection, the second measurement signal is assigned to the emission of NOx (time period A), and then to the emission of NH3 (time period B). However, as can be seen, in this context an excessively late switch-over to NH3 takes place, so that the measurement is less precise.

What is claimed is:

1. A method for operating a nitrogen oxide sensor, the method comprising:
 sensing a first measurement signal of the nitrogen oxide sensor, the first measurement signal representing a detected voltage between a reference electrode and an external electrode;
 sensing a second measurement signal representing a measured gas content in a measuring chamber of the nitrogen oxide sensor;
 comparing the first measurement signal with a predefined first threshold value; and
 if the first threshold value is exceeded, assigning the second measurement signal to an emission of NH3.

2. The method as claimed in claim 1, further comprising:
 comparing the second measurement signal with a predefined second threshold value; and
 if the second threshold value is undershot, assigning the second measurement signal to an emission of NOx if the first measurement signal undershoots the predefined first threshold value.

3. The method as claimed in claim 1, wherein the method is carried out during a nitrogen oxide trap regeneration phase.

4. The method as claimed in claim 1, wherein the predefined first threshold value is approximately 450 mV.

5. The method as claimed in claim 1, wherein the predefined second threshold value is approximately 10 ppm.

6. A controller for a motor vehicle, the controller comprising:
 a processing unit;
 a data memory; and
 a communication interface;
 wherein the data memory stores a program for operating a nitrogen oxide sensor, wherein the processing unit executes the program comprising:

sensing a first measurement signal of the nitrogen oxide sensor, the first measurement signal representing a detected voltage between a reference electrode and an external electrode;

sensing a second measurement signal representing a measured gas content in a measuring chamber of the nitrogen oxide sensor;

comparing the first measurement signal with a predefined first threshold value; and if the first threshold value is exceeded, assigning the second measurement signal to an emission of NH3.

7. A motor vehicle comprising:

an internal combustion engine including a combustion chamber;

an exhaust tract transporting fluids exhausted from the combustion chamber;

a nitrogen oxide sensor disposed in the exhaust tract; and a controller programmed to:

sense a first measurement signal of the nitrogen oxide sensor, the first measurement signal representing a detected voltage between a reference electrode and an external electrode;

sense a second measurement signal representing a measured gas content in a measuring chamber of the nitrogen oxide sensor;

compare the first measurement signal with a predefined first threshold value; and if the first threshold value is exceeded, assign the second measurement signal to an emission of NH3.

\* \* \* \* \*